US009233631B2

(12) United States Patent
Humer et al.

(10) Patent No.: US 9,233,631 B2
(45) Date of Patent: *Jan. 12, 2016

(54) ADJUSTABLE HEAD RESTRAINT ASSEMBLY

(71) Applicant: Lear Corporation, Southfield, MI (US)

(72) Inventors: Mladen Humer, West Bloomfield, MI (US); Arjun Yetukuri, Rochester Hills, MI (US); Eric Veine, Wixom, MI (US)

(73) Assignee: Lear Corporation, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/159,985

(22) Filed: Jan. 21, 2014

(65) Prior Publication Data

US 2014/0203616 A1 Jul. 24, 2014

Related U.S. Application Data

(60) Provisional application No. 61/756,054, filed on Jan. 24, 2013.

(51) Int. Cl.
*A47C 1/10* (2006.01)
*B60N 2/48* (2006.01)

(52) U.S. Cl.
CPC ............ *B60N 2/4864* (2013.01); *B60N 2/4808* (2013.01)

(58) Field of Classification Search
CPC ....... B60N 2/4864; B60N 2/4882; A47C 1/10
USPC .................................. 297/406, 391, 407, 408
See application file for complete search history.

(56) References Cited

U.S. PATENT DOCUMENTS

| 1,471,168 | A | * | 10/1923 | Katz | 297/404 |
|---|---|---|---|---|---|
| 4,191,422 | A | * | 3/1980 | Inasawa et al. | 297/391 |
| 4,265,482 | A | * | 5/1981 | Nishimura et al. | 297/391 |
| 4,278,291 | A | | 7/1981 | Asai | |
| 4,540,217 | A | * | 9/1985 | Suzuki | 297/391 |
| 4,657,304 | A | | 4/1987 | Heesch et al. | |
| 4,657,425 | A | | 4/1987 | Takahashi | |

(Continued)

FOREIGN PATENT DOCUMENTS

| GB | 562608 | 7/1944 |
|---|---|---|
| WO | 2004089688 A1 | 10/2004 |

(Continued)

OTHER PUBLICATIONS

Humer, U.S. Appl. No. 14/159,112, entitled "Adjustable Head Restraint Assembly", filed Jan. 20, 2014, 17 pages.

*Primary Examiner* — Laurie Cranmer
(74) *Attorney, Agent, or Firm* — Brooks Kushman P.C.

(57) ABSTRACT

A head restraint assembly is provided with a first guide member mounted proximate to a vehicle seat back. A second guide member is mounted to the first guide member for translation along the first guide member. A locking mechanism is mounted to the second guide member in cooperation with the first guide member for locking the second guide member relative to the first guide member. The first and second guide members are the only guide members to minimize binding. The locking mechanism includes a torsion spring connected to the first guide member and oriented about the second guide member for locking the second guide member relative to the first guide member. A lever is mounted to the torsion spring for unlocking the torsion spring.

15 Claims, 4 Drawing Sheets

(56) References Cited

U.S. PATENT DOCUMENTS

| | | | |
|---|---|---|---|
| 5,666,861 A | 9/1997 | Fee et al. | |
| 5,967,613 A * | 10/1999 | McKeever | 297/397 |
| 6,899,395 B2 | 5/2005 | Yetukuri et al. | |
| 6,983,995 B1 | 1/2006 | Veine et al. | |
| 7,073,863 B1 * | 7/2006 | Low et al. | 297/404 |
| RE40,527 E * | 10/2008 | Veine et al. | 297/391 |
| 7,631,932 B2 * | 12/2009 | Hoffmann | 297/216.12 |
| 8,348,348 B2 * | 1/2013 | Eckstein et al. | 297/409 |
| 8,833,860 B2 * | 9/2014 | Fey et al. | 297/408 |
| 8,882,193 B2 * | 11/2014 | Frose et al. | 297/216.12 |
| 8,950,815 B2 * | 2/2015 | Wang et al. | 297/410 |
| 2006/0250017 A1 | 11/2006 | Otto et al. | |
| 2008/0296953 A1 * | 12/2008 | Veine et al. | 297/407 |
| 2009/0058162 A1 * | 3/2009 | Boes et al. | 297/406 |
| 2009/0146479 A1 | 6/2009 | Boes et al. | |
| 2010/0270841 A1 | 10/2010 | Sobieski et al. | |
| 2010/0270842 A1 | 10/2010 | Mueller et al. | |
| 2011/0109143 A1 | 5/2011 | Maddelein et al. | |
| 2012/0080922 A1 | 4/2012 | Fey et al. | |

FOREIGN PATENT DOCUMENTS

| | | |
|---|---|---|
| WO | 2007073034 A1 | 6/2007 |
| WO | 2012097990 A1 | 7/2012 |

\* cited by examiner

ADJUSTABLE HEAD RESTRAINT ASSEMBLY

CROSS-REFERENCE TO RELATED APPLICATIONS

This application claims the benefit of U.S. provisional application Ser. No. 61/756,054 filed Jan. 24, 2013, the disclosure of which is hereby incorporated in its entirety by reference herein.

TECHNICAL FIELD

Embodiments relate to adjustable head restraint assemblies.

BACKGROUND

An adjustable head restraint assembly is disclosed in Low et al. U.S. Pat. No. 7,073,863 B1, which issued on Jul. 11, 2006.

SUMMARY

According to at least one embodiment, a head restraint assembly is provided with a first guide member mounted proximate to a vehicle seat back. A second guide member is mounted to the first guide member for translation along the first guide member. A locking mechanism is mounted to the second guide member in cooperation with the first guide member for locking the second guide member relative to the first guide member. The first and second guide members are the only guide members to minimize binding.

According to at least another embodiment, a head restraint assembly is provided with a first guide member mounted proximate to a vehicle seat back. A second guide member is mounted to the first guide member for translation along the first guide member. A torsion spring is connected to the first guide member and oriented about the second guide member for locking the second guide member relative to the first guide member. A lever is mounted to the torsion spring for unlocking the torsion spring.

According to at least another embodiment, a head restraint assembly is provided with a pair of bushings adapted to be mounted proximate to a seat back. A guide shaft is received within the pair of bushings to translate along the pair of bushings. A torsion spring is oriented about the guide shaft, retained between the pair of bushings and sized to tighten about the guide shaft and lock to a position upon the guide shaft. A pair of levers is pivotally mounted to the guide shaft, each operably connected to an end of the torsion spring.

DETAILED DESCRIPTION

Figure 2:
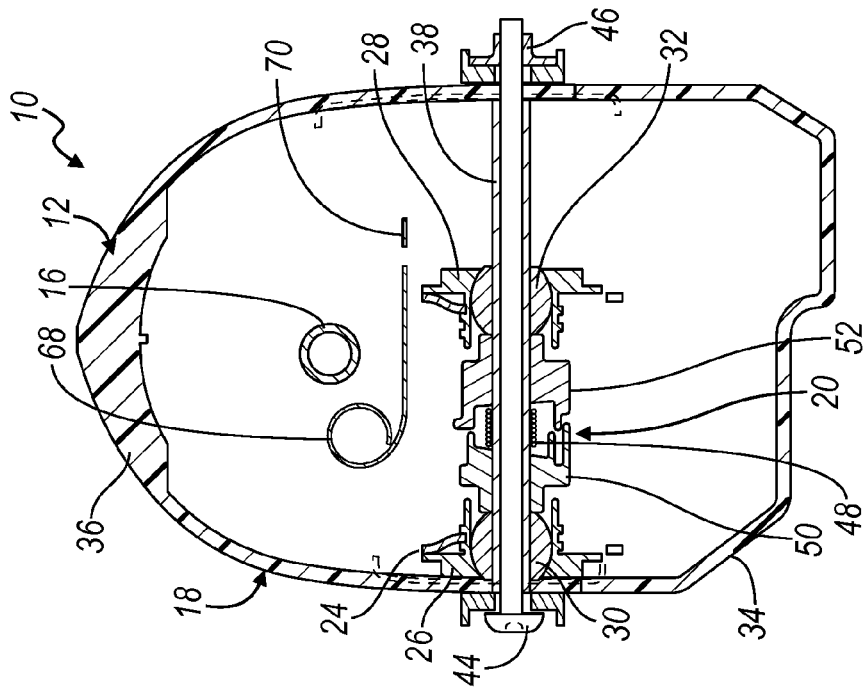
FIG. 2 is a partial section view of the head restraint assembly of FIG. 1.
Figure 1:
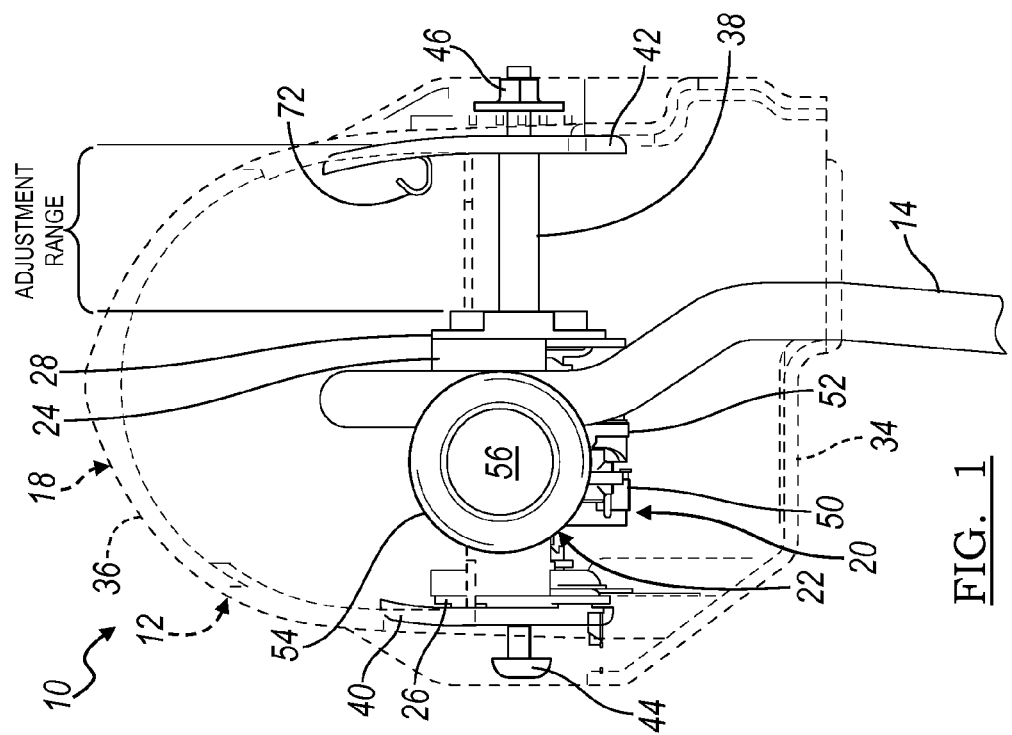
FIG. 1 is a side elevation view of an adjustable head restraint assembly according to an embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring to FIGS. 1-5, a movable head restraint assembly is illustrated and referenced generally by numeral 10. The head restraint assembly 10 is provided adjacent a seat back 74 extending from a seat bottom 76 of a vehicle seat 78; and may be mounted directly to the vehicle seat 78 or directly to a body of a vehicle 80 adjacent the seat back 74 for supporting the head of an occupant. The seat assembly 78 may be for a vehicle 80 such as a car, truck, aircraft, watercraft, or the like. The movable head restraint assembly 10 is illustrated including a head restraint 12 provided upon a support post 14.

The support post 14 may be fixed relative to the vehicle 80 or the vehicle seat back 74. The support post 14 may be received within a guide sleeve for upright adjustment relative to the seat back 74. The support post 14 may have any suitable configuration. For example, one or more support posts 14 may extend from the head restraint 12. Moreover, the support post 14 may be formed integrally with another support post 14 with a crossbar 16 interconnecting and spacing apart the support posts 14. The support posts 14 may be made of any suitable material or materials such as a metal or metal alloy.

The head restraint 12 may include a trim cover (not shown) for enclosing foam (also not shown), a housing 18, and a locking mechanism 20. A manual button assembly 22 extends from the housing 18 in the trim cover for manual actuation for disengaging the locking mechanism 20. The button assembly 22 is illustrated oriented to be manually actuated by being pressed in a lateral direction of the head restraint 12. Pressing the button assembly 22 releases the locking mechanism 20 and permits movement of the head restraint 12 relative to the support posts 14 in a fore and aft direction, which may be horizontal. In FIGS. 1-4, the head restraint 12 is illustrated at a limit in one direction, the aft direction, relative to the vehicle. Thus, by depressing the button assembly 22, the occupant may move the head restraint 12 in the fore direction from the position depicted, or to multiple, non-incremental positions therebetween.

Figure 3:
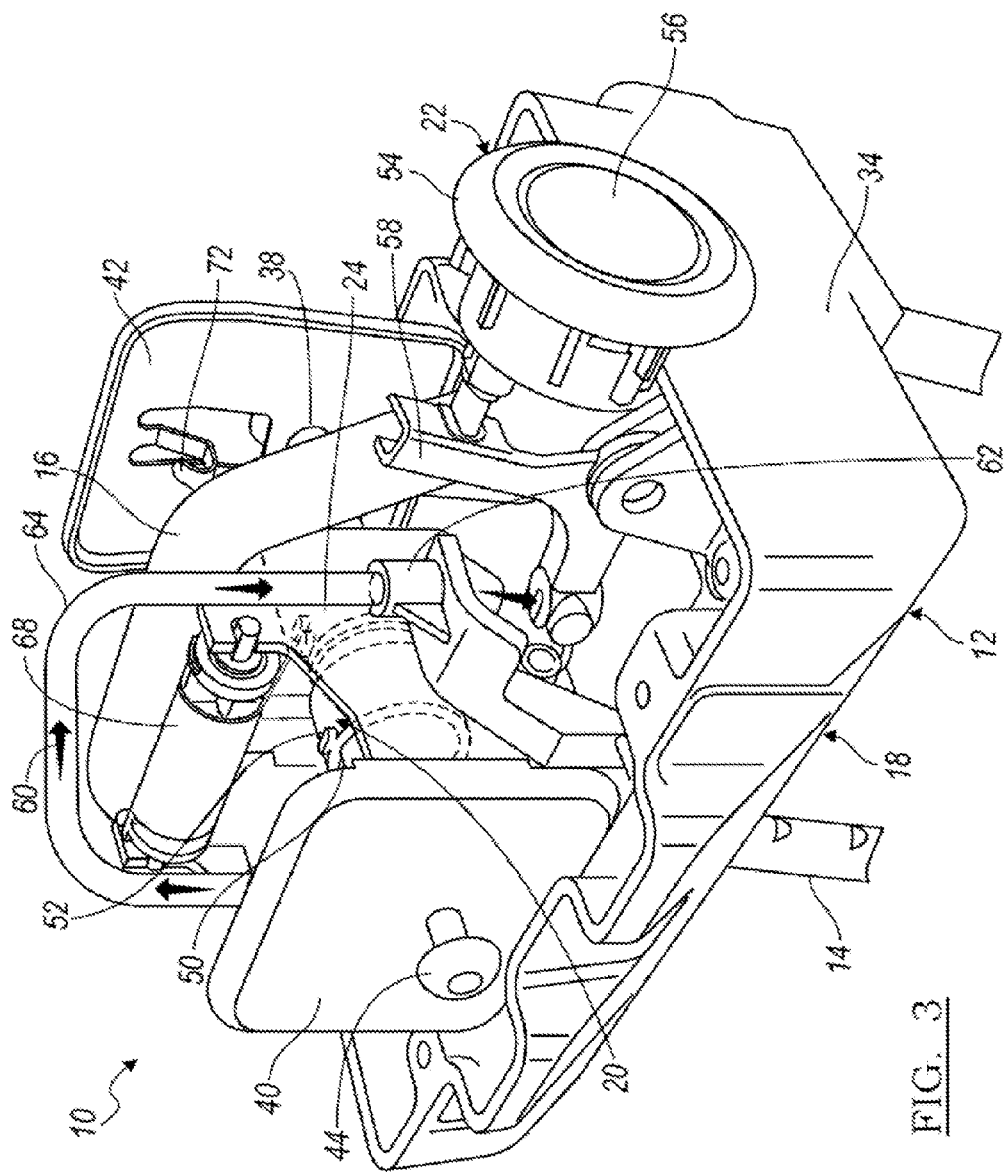
FIG. 3 is a partial front perspective view of the head restraint assembly of FIG. 1.

With reference specifically to FIG. 3, a frame 24 is mounted to the crossbar 16 for supporting the head restraint 12. The frame 24 supports a pair of nuts 26, 28, (FIGS. 1, 2 and 4) which are each threaded into the frame 24. The nuts 26, 28 each retain a bushing 30, 32 (FIG. 2) with the locking mechanism 20 oriented therebetween.

The housing 18 includes a pair of shells 34, 36, which are sized to mate and retain the components of the head restraint 12 therein. The upper shell 36 is illustrated removed in FIGS. 3 and 4. A guide shaft 38 extends in a fore and aft direction of the head restraint 12 is mounted to the shells 34, 36 by a pair of brackets 40, 42, which are retained within the shells 34, 36. A through bolt 44 extends through the upper shell 36, the bracket 40, the nut 26 and bushing 30, the locking mechanism 20, the nut 28 and bushing 32, the bracket 42, the upper shell 36 again, and a nut 46. The guide shaft 38 cooperates with the bushings 30, 32 for translation of the guide shaft 38, and consequently the head restraint 12, relative to the bushings 30, 32 and the support posts 14 for adjustment of the head restraint 12 relative to the support posts 14.

The locking mechanism 20 includes a torsion spring 48 (FIG. 2) oriented about the guide shaft 38 and sized to tighten about the guide shaft 38 and lock to a position upon the guide shaft 38. Each end of the torsion spring 48 is connected to a lever 50, 52, which are each also pivotally connected to the guide shaft 38 and are oriented between the bushings 30, 32. Counter rotation of the levers 50, 52 expands the torsion spring 48, thereby unlocking the torsion spring 48 from the guide shaft 38 for permitting movement of the guide shaft 38 and consequently the head restraint 12 relative to the support post 14.

Figure 4:
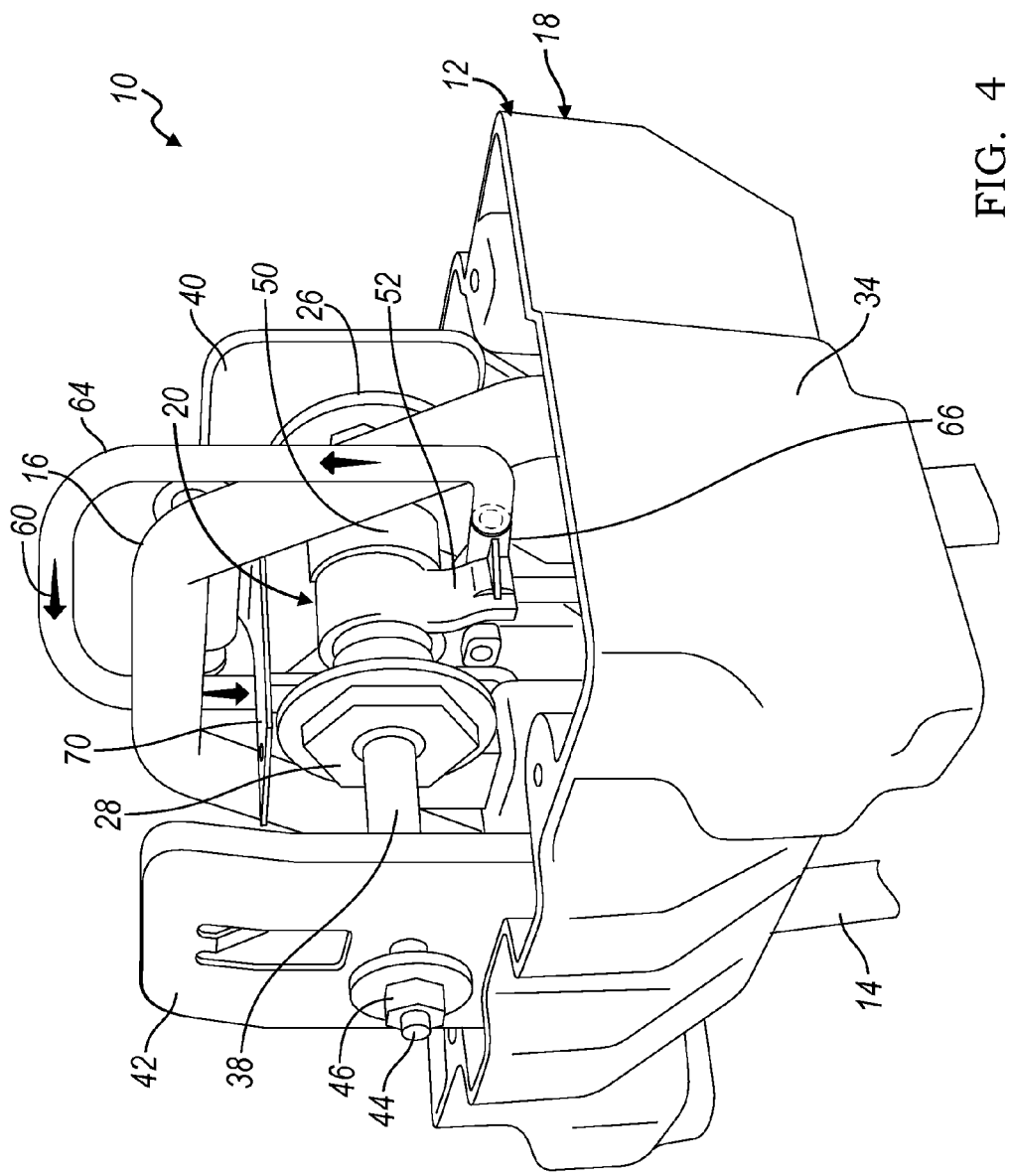
FIG. 4 is a partial rear perspective view of the head restraint assembly of FIG. 1.
Figure 5:
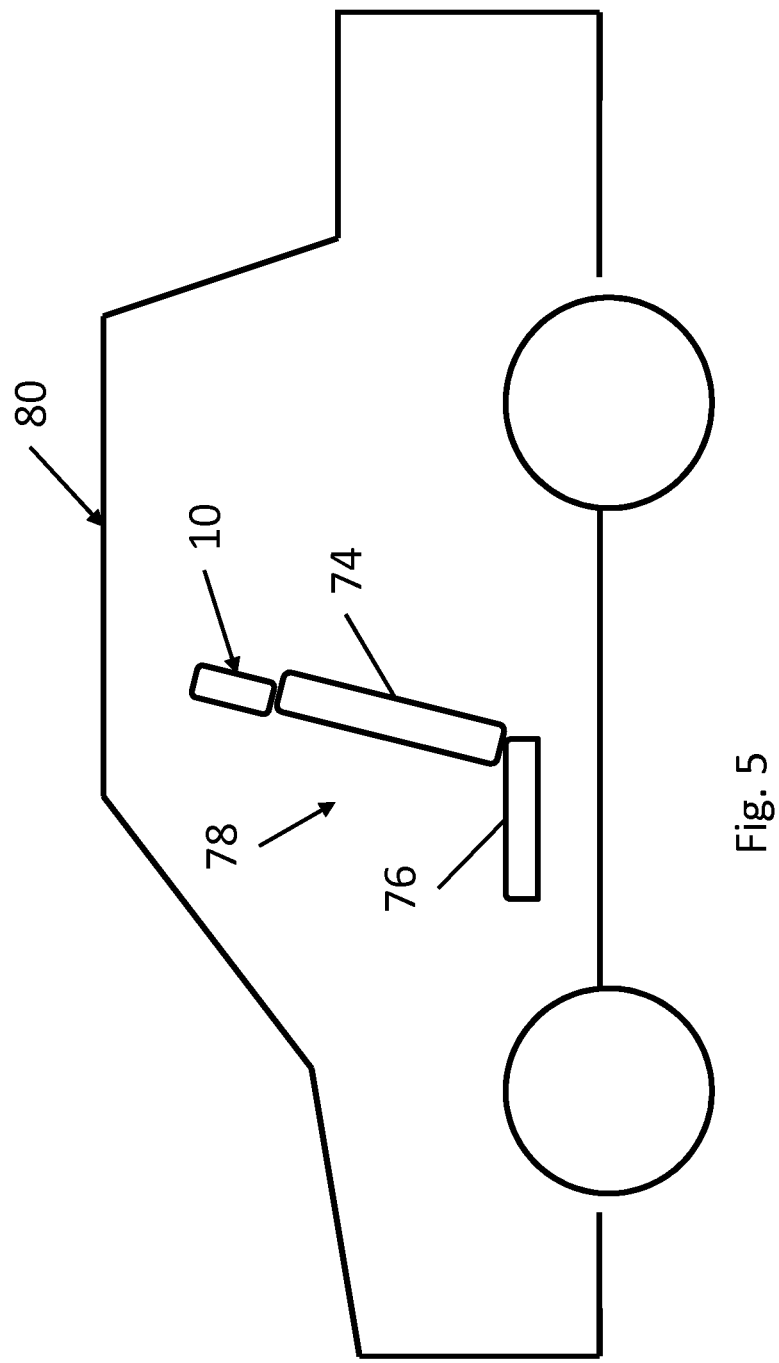
FIG. 5 is a schematic view of the head restraint assembly of FIG. 1 in a vehicle environment.

The button assembly 22 includes a bezel 54 mounted to the shells 34, 36. A button 56 is mounted in the bezel 54 for linear translation, which pivots a lever 58 (FIG. 3) that is pivotally connected to the lower shell 34. Referring now to FIGS. 3 and 4, a cable 60 is connected to the lever 58 and extends to a boss 62 (FIG. 3) that is provided upon the lower shell 34. A cable sheath 64 extends from the boss 62 to a boss 66 (FIG. 4) on the lever 52. The cable 60 extends through the sheath 64 and extends to the lever 50. The pivoting of the lever 58 downward, pulls the cable 60 within the sheath 64 thereby converging the levers 50, 52 for counter rotation of the levers 50, 52 relative to each other. This counter rotation expands the torsion spring 48 permitting adjustment of the guide shaft 38 within the torsion spring 48.

By providing only one guide shaft 38, binding is eliminated that is associated with tolerances and misalignments when utilizing multiple guide shafts. Additionally, utilization of the spherical bushings 30, 32 also permits flexibility for compliance with tolerances and misalignments. By utilization of the guide shaft 38 with the torsion spring 48, multiple adjustment positions are permitted that are not limited to specific notches or detents. This positional flexibility is often referred to as infinitely adjustable.

A drum spring return mechanism 68 is supported upon the frame 24 with a distal end 70 extending from the mechanism 68 and connecting to a hook 72 on the bracket 42. The drum spring mechanism 68 provides a constant force on the bracket 42 and consequently the head restraint 12 to bias the head restraint 12 to a forward-most position when unlocked from the locking mechanism 20. Thus, the head restraint assembly 10 provides one-handed operation for adjustment in the fore and aft direction. The occupant does not need to pull the head restraint 12 forward. By unlocking the locking mechanism 20, the head restraint 12 travels to a forward position. The occupant can move the head restraint 12 rearward, when the locking mechanism is unlocked by pressing his or her head rearward against the head restraint in order to obtain a desired position.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A head restraint assembly comprising:
a first guide member adapted to be mounted proximate to a seat back;
a second guide member mounted to the first guide member for translation along the first guide member, wherein the first and second guide members are the only guide members to minimize binding;
a locking mechanism mounted to the second guide member in cooperation with the first guide member to lock the second guide member relative to the first guide member;
a frame mounted to at least one support post, wherein the first guide member is supported by the frame;
wherein the first guide member comprises a pair of bushings; and
wherein the head restraint assembly further comprises a pair of nuts mounted to the frame to retain the pair of bushings;
a housing supported upon the second guide member; and
a drum spring return mechanism supported upon the frame with a distal end connected to the housing to translate the housing to a return position when the locking mechanism is unlocked.

2. The head restraint assembly of claim 1 wherein the at least one support post is adapted to be mounted to a seat back, and wherein the first guide member is mounted to the at least one support post.

3. The head restraint assembly of claim 1 wherein the second guide member comprises a guide shaft.

4. The head restraint assembly of claim 3 wherein the housing is mounted to the guide shaft.

5. The head restraint assembly of claim 4 wherein the housing comprises a pair of mating shells that retain the guide shaft therebetween.

6. The head restraint assembly of claim 5 further comprising a pair of brackets, each bracket retained within one of the pair of shells, wherein the guide shaft is mounted to the pair of brackets.

7. The head restraint assembly of claim 6 further comprising a fastener extending through the pair of shells, the pair of brackets and the guide shaft.

8. The head restraint assembly of claim 3 wherein the locking mechanism is provided on the guide shaft.

9. The head restraint assembly of claim 8 wherein the locking mechanism comprises a torsion spring oriented about the guide shaft and sized to tighten about the guide shaft and lock to a position upon the guide shaft.

10. The head restraint assembly of claim 9 wherein the locking mechanism further comprises a pair of levers each pivotally mounted to the guide shaft, and each operably connected to an end of the torsion spring.

11. The head restraint assembly of claim 10 further comprising a cable assembly connected to the pair of levers to counter rotate the levers to expand the torsion spring, thereby unlocking the torsion spring from the guide shaft to permit movement of the guide shaft.

12. The head restraint assembly of claim 11 wherein the housing is mounted to the guide shaft; and
wherein the locking mechanism further comprises a manual button assembly mounted to the housing and operably connected to the cable assembly to actuate the cable assembly.

13. The head restraint assembly of claim 12 wherein the locking mechanism further comprises:
a boss mounted to the housing; and
a third lever pivotally connected to the housing so that manual actuation of the button assembly pivots the third lever; and
wherein the cable assembly comprises:
a sheath mounted to the boss and one of the pair of levers, and
a cable extending from the third lever, through the boss, through the sheath, and connected to the other pair of levers so that pivoting of the third lever translates the cable within the sheath, thereby counter-rotating the pair of levers and expanding the torsion spring to unlock the guide shaft and permit translation of the guide shaft.

14. A seat assembly comprising:
a seat bottom;

a seat back extending upright from the seat bottom; and
a head restraint assembly according to claim 1.

15. The seat assembly of claim 14 wherein at least one of the seat bottom and the seat back is adapted to be mounted to a vehicle.

* * * * *